US010866928B2

(12) United States Patent
Lin et al.

(10) Patent No.: US 10,866,928 B2
(45) Date of Patent: Dec. 15, 2020

(54) METHODS FOR OPTIMIZED VARIABLE-SIZE DEDUPLICATION USING TWO STAGE CONTENT-DEFINED CHUNKING AND DEVICES THEREOF

(71) Applicant: NetApp, Inc., Sunnyvale, CA (US)

(72) Inventors: Xing Lin, Fremont, CA (US); Fan Ni, Sunnyvale, CA (US)

(73) Assignee: NETAPP, INC., Sunnyvale, CA (US)

( * ) Notice: Subject to any disclaimer, the term of this patent is extended or adjusted under 35 U.S.C. 154(b) by 195 days.

(21) Appl. No.: 16/247,014

(22) Filed: Jan. 14, 2019

(65) Prior Publication Data

US 2020/0081868 A1 Mar. 12, 2020

Related U.S. Application Data

(60) Provisional application No. 62/743,352, filed on Oct. 9, 2018, provisional application No. 62/729,181, filed on Sep. 10, 2018.

(51) Int. Cl.
*G06F 16/174* (2019.01)
*G06F 16/14* (2019.01)

(52) U.S. Cl.
CPC ........ *G06F 16/1752* (2019.01); *G06F 16/152* (2019.01)

(58) Field of Classification Search
CPC ........................ G06F 16/1752; G06F 16/152

(Continued)

(56) References Cited

U.S. PATENT DOCUMENTS 6,374,210 B1 * 4/2002 Chu .................. G06F 40/53
704/9
7,979,491 B2 * 7/2011 Lillibridge ........ G06F 16/90348
709/205

(Continued)

FOREIGN PATENT DOCUMENTS

KR 20170104509 A 9/2017
KR 20180021074 A 2/2018
KR 20180094004 A 8/2018

OTHER PUBLICATIONS

Selvan et al., "Two Stage Max Gain Content Defined Chunking for Deduplication", International Journal of Engineering Research and Development, vol. 4, Issue 4, Oct. 2012, pp. 01-06. (Year: 2012).*

(Continued)

*Primary Examiner* — Phuong Thao Cao
(74) *Attorney, Agent, or Firm* — Troutman Pepper Hamilton Sanders LLP (Rochester)

(57) ABSTRACT

Methods, non-transitory machine readable media, and computing devices that compare a hash value to a predefined value for sliding windows in parallel for segments partitioned from an input data stream. A bit array is parsed according to minimum and maximum chunk sizes to identify chunk boundaries for the input data stream. The bit array is populated based on a result of the comparison and portions of the bit array are parsed in parallel. Unique chunks of the input data stream defined by the chunk boundaries are stored in a storage device. Accordingly, this technology utilizes parallel processing in two stages. In a first stage, rolling window based hashing is performed concurrently to identify potential chunk boundaries. In a second stage, actual chunk boundaries are selected based on minimum and maximum chunk size constraints. This technology advantageously facilitates significant deduplication ratio improvement as well as improved parallel chunking performance.

18 Claims, 6 Drawing Sheets

(58) Field of Classification Search
USPC .................................................. 707/692
See application file for complete search history.

(56) References Cited

U.S. PATENT DOCUMENTS

| | | | |
|---|---|---|---|
| 8,001,273 B2* | 8/2011 | Lillibridge | G06F 9/5066 709/246 |
| 8,028,106 B2* | 9/2011 | Bondurant | G06F 3/0608 710/68 |
| 8,117,343 B2* | 2/2012 | Lillibridge | G06F 3/061 709/246 |
| 9,367,557 B1* | 6/2016 | Lin | G06F 16/1744 |
| 9,477,677 B1* | 10/2016 | Wang | G06F 16/1752 |
| 2002/0107877 A1 | 8/2002 | Whiting et al. | |
| 2007/0240086 A1* | 10/2007 | Sinha | G06F 30/398 716/52 |
| 2008/0133446 A1 | 6/2008 | Dubnicki et al. | |
| 2008/0133561 A1* | 6/2008 | Dubnicki | G06F 11/1453 |
| 2010/0235485 A1* | 9/2010 | Lillibridge | G06F 9/5066 709/223 |
| 2011/0276744 A1 | 12/2011 | Sengupta et al. | |
| 2011/0307447 A1 | 12/2011 | Sabaa et al. | |
| 2013/0318051 A1 | 11/2013 | Kumar et al. | |
| 2014/0115182 A1 | 4/2014 | Sabaa et al. | |
| 2014/0136490 A1* | 5/2014 | Saliba | G06F 16/1748 707/692 |
| 2014/0244604 A1 | 8/2014 | Oltean et al. | |
| 2014/0258245 A1* | 9/2014 | Estes | G06F 16/1748 707/692 |
| 2014/0304238 A1* | 10/2014 | Halla-Aho | H04L 51/12 707/692 |
| 2015/0019502 A1 | 1/2015 | Aronovich et al. | |
| 2015/0356134 A1 | 12/2015 | Hayasaka et al. | |
| 2016/0188668 A1 | 6/2016 | Sharangpani | |

OTHER PUBLICATIONS

Xia et al., "FastCDC: a Fast and Efficient Content-Defined Chunking Approach for Data Deduplication", in Proceedings of the 2016 USENIX Annual Technical Conference (USENIX ATC '16), Jun. 22-24, 2016, pp. 101-114. (Year: 2016).*

Wang et al., "Research on a Clustering Data De-Duplication Mechanism Based on Bloom Filter", 2010 International Conference on Multimedia Technology, 2010, pp. 1-5, IEEE Xplore Digital Library, ieeexplore.ieee.org/abstract/document/5630395.

* cited by examiner

METHODS FOR OPTIMIZED VARIABLE-SIZE DEDUPLICATION USING TWO STAGE CONTENT-DEFINED CHUNKING AND DEVICES THEREOF

This application claims the benefit of U.S. Provisional Patent Application Ser. No. 62/743,352, filed Oct. 9, 2018, and U.S. Provisional Patent Application Ser. No. 62/729,181, filed Sep. 10, 2018, each of which is hereby incorporated by reference in its entirety.

FIELD

This technology generally relates to deduplication in data storage networks and, more particularly, to methods and devices for optimizing variable-size deduplication using two stage content-defined chunking.

BACKGROUND

Data deduplication, a technique for data reduction, has been widely deployed in storage systems to improve storage efficiency and I/O performance. In chunk-based deduplication, the input data stream is partitioned into chunks, and only unique chunks are stored.

There are two approaches to chunk-based deduplication: fixed-size chunking and variable-size chunking. In fixed-size chunking, the input data stream is partitioned into fixed-size chunks. Fixed-size chunking is relatively fast because it does not require any computation based on input data. However, insertions and deletions to the same file will introduce boundary shifts, leading to a relatively poor deduplication ratio.

To solve this problem, variable-size chunking was developed and then further improved through the use of content-defined variable-size chunking. In content-defined variable-size chunking, the chunk boundary is determined by the content of the input data stream. In a typical content-defined chunking implementation, a fixed-size sliding window is used and, for each sliding window, a hash value is determined over the contents and compared with a pre-defined value.

If the hash value matches the pre-defined value, the end of the window is declared as a chunk boundary. Otherwise, the sliding window is moved forward and the hash computation and comparison process is repeated for the new sliding window. When minimum and maximum chunk sizes are specified, the sliding window hash process is started after skipping the first minimum chunk size bytes. A chunk boundary is then declared when the maximum chunk size is reached and no chunk boundary is yet detected from the sliding window hash process.

However, the sliding-window based hash process is very compute intensive, as it requires a hash calculation for every sliding window. Thus, if performed sequentially, the performance will be relatively poor. To improve performance, the input data can be partitioned into equal-size segments and the content-based chunking can be performed in parallel using parallel hardware, which is referred to as parallel content-defined chunking.

Since each segment is processed independently at each processing unit in parallel content-defined chunking, a chunk is forced to cut at the end of each segment. In particular, the last chunk that is forced to cut from the previous segment may span over to the current segment. Spanning the current segment can lead to different starting points since the first minimum chunk size is always skipped.

Accordingly, compared to sequential content-defined chunking, the segment-based deduplication is less efficient in detecting duplicate blocks, leading to significant degradation in deduplication ratio.

DETAILED DESCRIPTION

Figure 1:
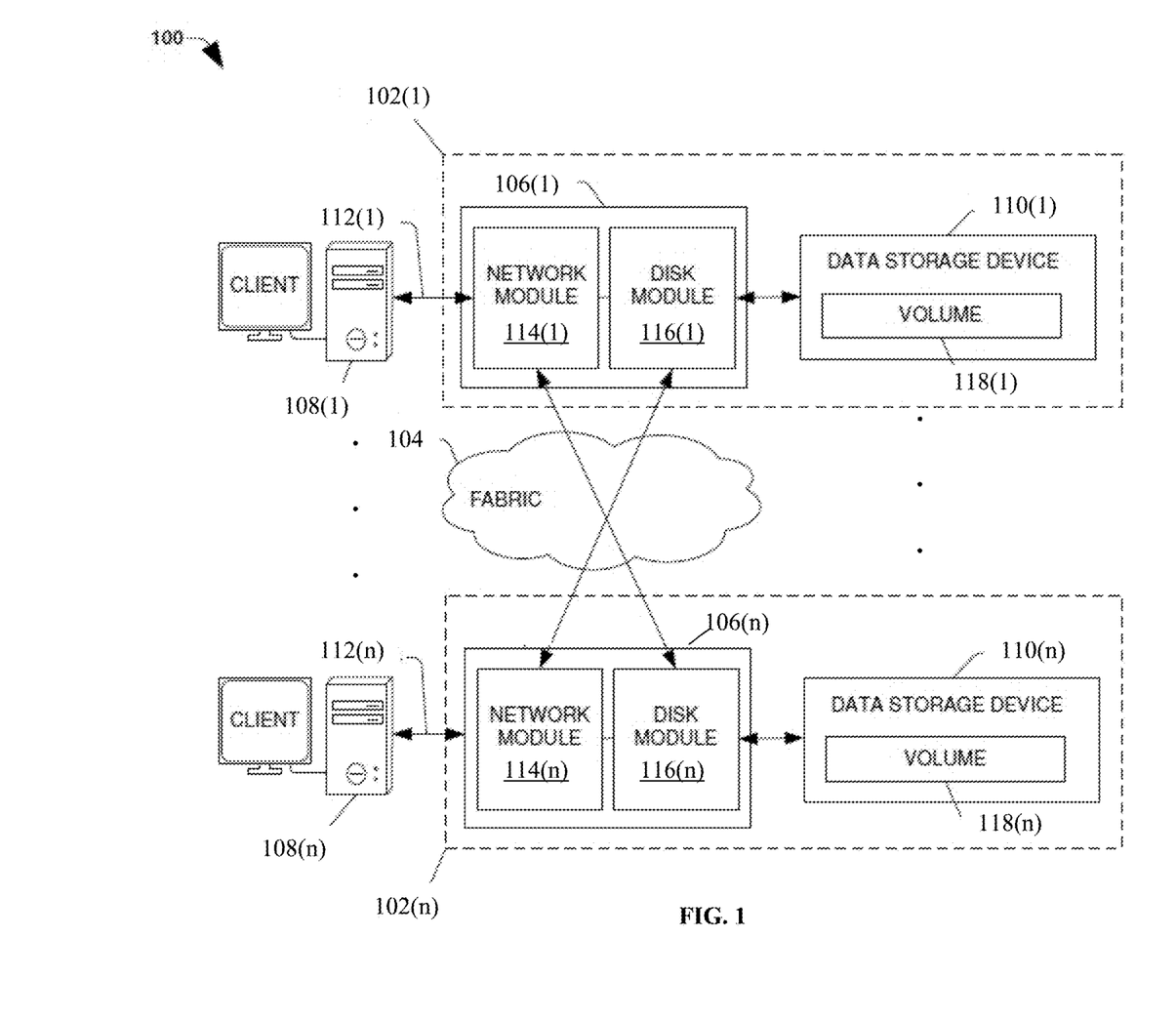
FIG. 1 is a block diagram of a network environment with exemplary node computing devices.

A clustered network environment 100 that may implement one or more aspects of the technology described and illustrated herein is shown in FIG. 1. The clustered network environment 100 includes data storage apparatuses 102(1)-102(n) that are coupled over a cluster fabric 104 facilitating communication between the data storage apparatuses 102(1)-102(n) (and one or more modules, components, etc. therein, such as, node computing devices 106(1)-106(n), for example), although any number of other elements or components can also be included in the clustered network environment 100 in other examples. This technology provides a number of advantages including methods, non-transitory computer readable media, and computing devices that facilitate improved deduplication ratios and performance.

In this example, node computing devices 106(1)-106(n) can be primary or local storage controllers or secondary or remote storage controllers that provide client devices 108(1)-108(n) with access to data stored within data storage devices 110(1)-110(n). The data storage apparatuses 102(1)-102(n) and/or node computing devices 106(1)-106(n) of the examples described and illustrated herein are not limited to any particular geographic areas and can be clustered locally and/or remotely, or not clustered in other examples. Thus, in one example the data storage apparatuses 102(1)-102(n) and/or node computing device 106(1)-106(n) can be distributed over a plurality of storage systems located in a plurality of geographic locations; while in another example a clustered network can include data storage apparatuses 102(1)-102(n) and/or node computing device 106(1)-106(n) residing in a same geographic location (e.g., in a single onsite rack).

In the illustrated example, one or more of the client devices 108(1)-108(n), which may be, for example, personal computers (PCs), computing devices used for storage (e.g., storage servers), or other computers or peripheral devices, are coupled to the respective data storage apparatuses 102(1)-102(n) by network connections 112(1)-112(n). Network connections 112(1)-112(n) may include a local area network (LAN) or wide area network (WAN), for example, that utilize Network Attached Storage (NAS) protocols, such as a Common Internet Filesystem (CIFS) protocol or a Network Filesystem (NFS) protocol to exchange data packets, a Storage Area Network (SAN) protocol, such as Small Computer System Interface (SCSI) or Fiber Channel Protocol (FCP), an object protocol, such as simple storage service (S3), and/or non-volatile memory express (NVMe), for example.

Illustratively, the client devices 108(1)-108(n) may be general-purpose computers running applications and may interact with the data storage apparatuses 102(1)-102(n) using a client/server model for exchange of information. That is, the client devices 108(1)-108(n) may request data from the data storage apparatuses 102(1)-102(n) (e.g., data on one of the data storage devices 110(1)-110(n) managed by a network storage controller configured to process I/O commands issued by the client devices 108(1)-108(n)), and the data storage apparatuses 102(1)-102(n) may return results of the request to the client devices 108(1)-108(n) via the network connections 112(1)-112(n).

The node computing devices 106(1)-106(n) of the data storage apparatuses 102(1)-102(n) can include network or host nodes that are interconnected as a cluster to provide data storage and management services, such as to an enterprise having remote locations, cloud storage (e.g., a storage endpoint may be stored within a data cloud), etc., for example. Such node computing devices 106(1)-106(n) can be attached to the fabric 104 at a connection point, redistribution point, or communication endpoint, for example. One or more of the node computing devices 106(1)-106(n) may be capable of sending, receiving, and/or forwarding information over a network communications channel, and could comprise any type of device that meets any or all of these criteria.

In an example, the node computing devices 106(1) and 106(n) may be configured according to a disaster recovery configuration whereby a surviving node provides switchover access to the storage devices 110(1)-110(n) in the event a disaster occurs at a disaster storage site (e.g., the node computing device 106(1) provides client device 112(n) with switchover data access to storage devices 110(n) in the event a disaster occurs at the second storage site). In other examples, the node computing device 106(n) can be configured according to an archival configuration and/or the node computing devices 106(1)-106(n) can be configured based on another type of replication arrangement (e.g., to facilitate load sharing). Additionally, while two node computing devices are illustrated in FIG. 1, any number of node computing devices or data storage apparatuses can be included in other examples in other types of configurations or arrangements.

As illustrated in the clustered network environment 100, node computing devices 106(1)-106(n) can include various functional components that coordinate to provide a distributed storage architecture. For example, the node computing devices 106(1)-106(n) can include network modules 114(1)-114(n) and disk modules 116(1)-116(n). Network modules 114(1)-114(n) can be configured to allow the node computing devices 106(1)-106(n) (e.g., network storage controllers) to connect with client devices 108(1)-108(n) over the storage network connections 112(1)-112(n), for example, allowing the client devices 108(1)-108(n) to access data stored in the clustered network environment 100.

Further, the network modules 114(1)-114(n) can provide connections with one or more other components through the cluster fabric 104. For example, the network module 114(1) of node computing device 106(1) can access the data storage device 110(n) by sending a request via the cluster fabric 104 through the disk module 116(n) of node computing device 106(n). The cluster fabric 104 can include one or more local and/or wide area computing networks embodied as Infiniband, Fibre Channel (FC), or Ethernet networks, for example, although other types of networks supporting other protocols can also be used.

Disk modules 116(1)-116(n) can be configured to connect data storage devices 110(1)-110(2), such as disks or arrays of disks, SSDs, flash memory, or some other form of data storage, to the node computing devices 106(1)-106(n). Often, disk modules 116(1)-116(n) communicate with the data storage devices 110(1)-110(n) according to the SAN protocol, such as SCSI or FCP, for example, although other protocols can also be used. Thus, as seen from an operating system on node computing devices 106(1)-106(n), the data storage devices 110(1)-110(n) can appear as locally attached. In this manner, different node computing devices 106(1)-106(n), etc. may access data blocks, files, or objects through the operating system, rather than expressly requesting abstract files.

While the clustered network environment 100 illustrates an equal number of network modules 114(1)-114(2) and disk modules 116(1)-116(n), other examples may include a differing number of these modules. For example, there may be a plurality of network and disk modules interconnected in a cluster that do not have a one-to-one correspondence between the network and disk modules. That is, different node computing devices can have a different number of network and disk modules, and the same node computing device can have a different number of network modules than disk modules.

Further, one or more of the client devices 108(1)-108(n) can be networked with the node computing devices 106(1)-106(n) in the cluster, over the storage connections 112(1)-112(n). As an example, respective client devices 108(1)-108(n) that are networked to a cluster may request services (e.g., exchanging of information in the form of data packets) of node computing devices 106(1)-106(n) in the cluster, and the node computing devices 106(1)-106(n) can return results of the requested services to the client devices 108(1)-108(n). In one example, the client devices 108(1)-108(n) can exchange information with the network modules 114(1)-114(n) residing in the node computing devices 106(1)-106(n) (e.g., network hosts) in the data storage apparatuses 102(1)-102(n).

In one example, the storage apparatuses 102(1)-102(n) host aggregates corresponding to physical local and remote data storage devices, such as local flash or disk storage in the data storage devices 110(1)-110(n), for example. One or more of the data storage devices 110(1)-110(n) can include mass storage devices, such as disks of a disk array. The disks may comprise any type of mass storage devices, including but not limited to magnetic disk drives, flash memory, and any other similar media adapted to store information, including, for example, data and/or parity information.

The aggregates include volumes 118(1)-118(n) in this example, although any number of volumes can be included in the aggregates. The volumes 118(1)-118(n) are virtual data stores or storage objects that define an arrangement of storage and one or more filesystems within the clustered network environment 100. Volumes 118(1)-118(n) can span a portion of a disk or other storage device, a collection of disks, or portions of disks, for example, and typically define an overall logical arrangement of data storage. In one example volumes 118(1)-118(n) can include stored user data as one or more files, blocks, or objects that reside in a hierarchical directory structure within the volumes 118(1)-118(n). Volumes 118(1)-118(n) are typically configured in formats that may be associated with particular storage systems, and respective volume formats typically comprise features that provide functionality to the volumes 118(1)-118(n), such as providing the ability for volumes 118(1)-118(n) to form clusters, among other functionality.

In one example, to facilitate access to data stored on the disks or other structures of the data storage devices 110(1)-110(n), a filesystem may be implemented that logically organizes the information as a hierarchical structure of directories and files. In this example, respective files may be implemented as a set of disk blocks of a particular size that are configured to store information, whereas directories may be implemented as specially formatted files in which information about other files and directories are stored.

Data can be stored as files or objects within a physical volume and/or a virtual volume, which can be associated with respective volume identifiers. The physical volumes correspond to at least a portion of physical storage devices, such as the data storage devices 110(1)-110(n) (e.g., a Redundant Array of Independent (or Inexpensive) Disks (RAID system)) whose address, addressable space, location, etc. does not change. Typically the location of the physical volumes does not change in that the range of addresses used to access it generally remains constant.

Virtual volumes, in contrast, can be stored over an aggregate of disparate portions of different physical storage devices. Virtual volumes may be a collection of different available portions of different physical storage device locations, such as some available space from disks, for example. It will be appreciated that since the virtual volumes are not "tied" to any one particular storage device, virtual volumes can be said to include a layer of abstraction or virtualization, which allows it to be resized and/or flexible in some regards.

Further, virtual volumes can include one or more logical unit numbers (LUNs), directories, Qtrees, files, and/or other storage objects, for example. Among other things, these features, but more particularly the LUNs, allow the disparate memory locations within which data is stored to be identified, for example, and grouped as data storage unit. As such, the LUNs may be characterized as constituting a virtual disk or drive upon which data within the virtual volumes is stored within an aggregate. For example, LUNs are often referred to as virtual drives, such that they emulate a hard drive, while they actually comprise data blocks stored in various parts of a volume.

In one example, the data storage devices 110(1)-110(n) can have one or more physical ports, wherein each physical port can be assigned a target address (e.g., SCSI target address). To represent respective volumes, a target address on the data storage devices 110(1)-110(n) can be used to identify one or more of the LUNs. Thus, for example, when one of the node computing devices 106(1)-106(n) connects to a volume, a connection between the one of the node computing devices 106(1)-106(n) and one or more of the LUNs underlying the volume is created.

Respective target addresses can identify multiple of the LUNs, such that a target address can represent multiple volumes. The I/O interface, which can be implemented as circuitry and/or software in a storage adapter or as executable code residing in memory and executed by a processor, for example, can connect to volumes by using one or more addresses that identify the one or more of the LUNs.

Figure 2:
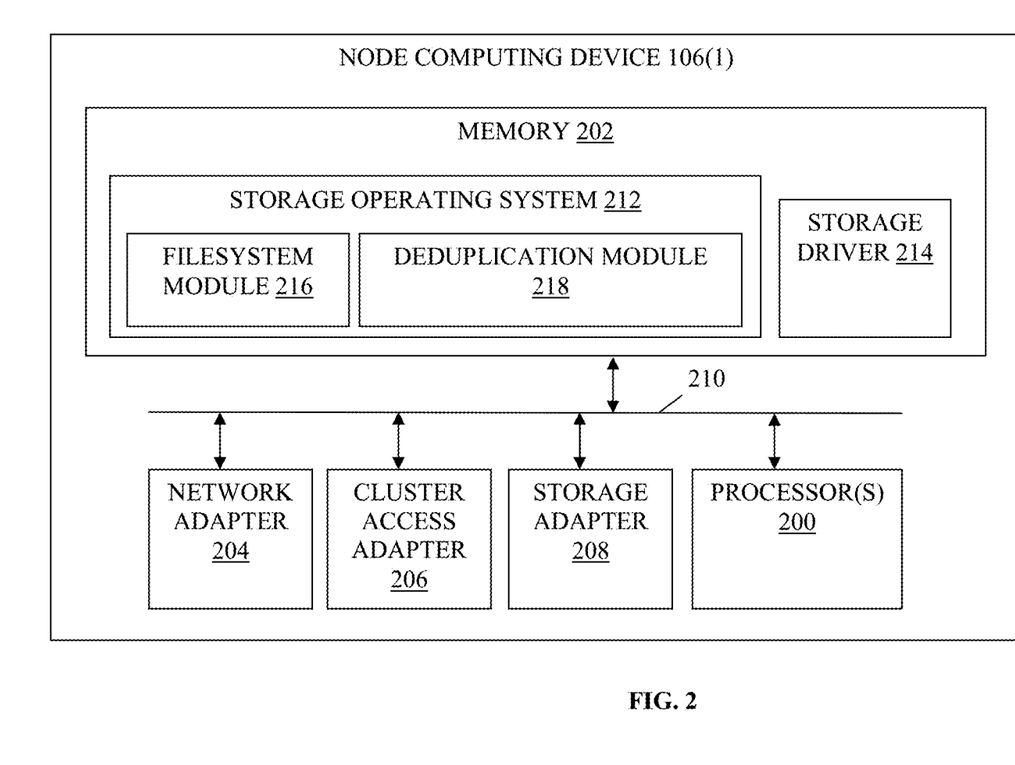
FIG. 2 is a block diagram of one of the exemplary node computing device of FIG. 1.

Referring to FIG. 2, node computing device 106(1) in this particular example includes processor(s) 200, a memory 202, a network adapter 204, a cluster access adapter 206, and a storage adapter 208 interconnected by a system bus 210. The node computing device 106 also includes a storage operating system 212 installed in the memory 206 that can, for example, implement a RAID data loss protection and recovery scheme to optimize reconstruction of data of a failed disk or drive in an array. In some examples, the node computing device 106(n) is substantially the same in structure and/or operation as node computing device 106(1), although the node computing device 106(n) can also include a different structure and/or operation in one or more aspects than the node computing device 106(1).

The network adapter 204 in this example includes the mechanical, electrical and signaling circuitry needed to connect the node computing device 106(1) to one or more of the client devices 108(1)-108(n) over network connections 112(1)-112(n), which may comprise, among other things, a point-to-point connection or a shared medium, such as a local area network. In some examples, the network adapter 204 further communicates (e.g., using TCP/IP) via the fabric 104 and/or another network (e.g. a WAN) (not shown) with cloud storage devices to process storage operations associated with data stored thereon.

The storage adapter 208 cooperates with the storage operating system 212 executing on the node computing device 106(1) to access information requested by one of the client devices 108(1)-108(n) (e.g., to access data on a data storage device 110(1)-110(n) managed by a network storage controller). The information may be stored on any type of attached array of writeable media such as magnetic disk drives, flash memory, and/or any other similar media adapted to store information.

In the exemplary data storage devices 110(1)-110(n), information can be stored in data blocks on disks. The storage adapter 208 can include I/O interface circuitry that couples to the disks over an I/O interconnect arrangement, such as a storage area network (SAN) protocol (e.g., Small Computer System Interface (SCSI), Internet SCSI (iSCSI), hyperSCSI, Fiber Channel Protocol (FCP)). The information is retrieved by the storage adapter 208 and, if necessary, processed by the processor(s) 200 (or the storage adapter 208 itself) prior to being forwarded over the system bus 210 to the network adapter 204 (and/or the cluster access adapter 206 if sending to another node computing device in the cluster) where the information is formatted into a data packet and returned to a requesting one of the client devices 108(1)-108(2) and/or sent to another node computing device attached via the cluster fabric 104. In some examples, a storage driver 214 in the memory 202 interfaces with the storage adapter to facilitate interactions with the data storage devices 110(1)-110(n).

The storage operating system 212 can also manage communications for the node computing device 106(1) among other devices that may be in a clustered network, such as attached to a cluster fabric 104. Thus, the node computing device 106(1) can respond to client device requests to manage data on one of the data storage devices 110(1)-110(n) (e.g., or additional clustered devices) in accordance with the client device requests.

The file system module 216 of the storage operating system 212 can establish and manage one or more filesystems including software code and data structures that implement a persistent hierarchical namespace of files and directories, for example. As an example, when a new data storage device (not shown) is added to a clustered network system, the file system module 216 is informed where, in an existing directory tree, new files associated with the new data storage device are to be stored. This is often referred to as "mounting" a filesystem.

In the example node computing device 106(1), memory 202 can include storage locations that are addressable by the processor(s) 200 and adapters 204, 206, and 208 for storing related software application code and data structures. The processor(s) 200 and adapters 204, 206, and 208 may, for example, include processing elements and/or logic circuitry configured to execute the software code and manipulate the data structures. The processor(s) in some examples comprise parallel processing and, in particular, can support Advanced Vector Extensions (AVX) extensions to the x86 instruction set architecture, as described and illustrated in more detail later.

The storage operating system 212, portions of which are typically resident in the memory 202 and executed by the processor(s) 200, invokes storage operations in support of a file service implemented by the node computing device 106(1). Other processing and memory mechanisms, including various computer readable media, may be used for storing and/or executing application instructions pertaining to the techniques described and illustrated herein. For example, the storage operating system 212 can also utilize one or more control files (not shown) to aid in the provisioning of virtual machines.

In this particular example, the storage operating system 212 further includes a deduplication module 218 that is configured to reduce the storage space utilized on one or more of the data storage devices 110(1)-110(n). The deduplication module 218 processes input data streams to facilitate identification, and storing on one or more of the data storage devices 110(1)-110(n), of unique chunks of the input data stream in order to improve storage utilization and optimize storage performance, for example, as described and illustrated in more detail later with reference to FIGS. 3-8.

The examples of the technology described and illustrated herein may be embodied as one or more non-transitory computer readable media having machine or processor-executable instructions stored thereon for one or more aspects of the present technology, which when executed by the processor(s) 200, cause the processor(s) 200 to carry out the steps necessary to implement the methods of this technology, as described and illustrated with the examples herein. In some examples, the executable instructions are configured to perform one or more steps of a method, such as one or more of the exemplary methods described and illustrated later with reference to FIGS. 3-6, for example.

Figure 3:
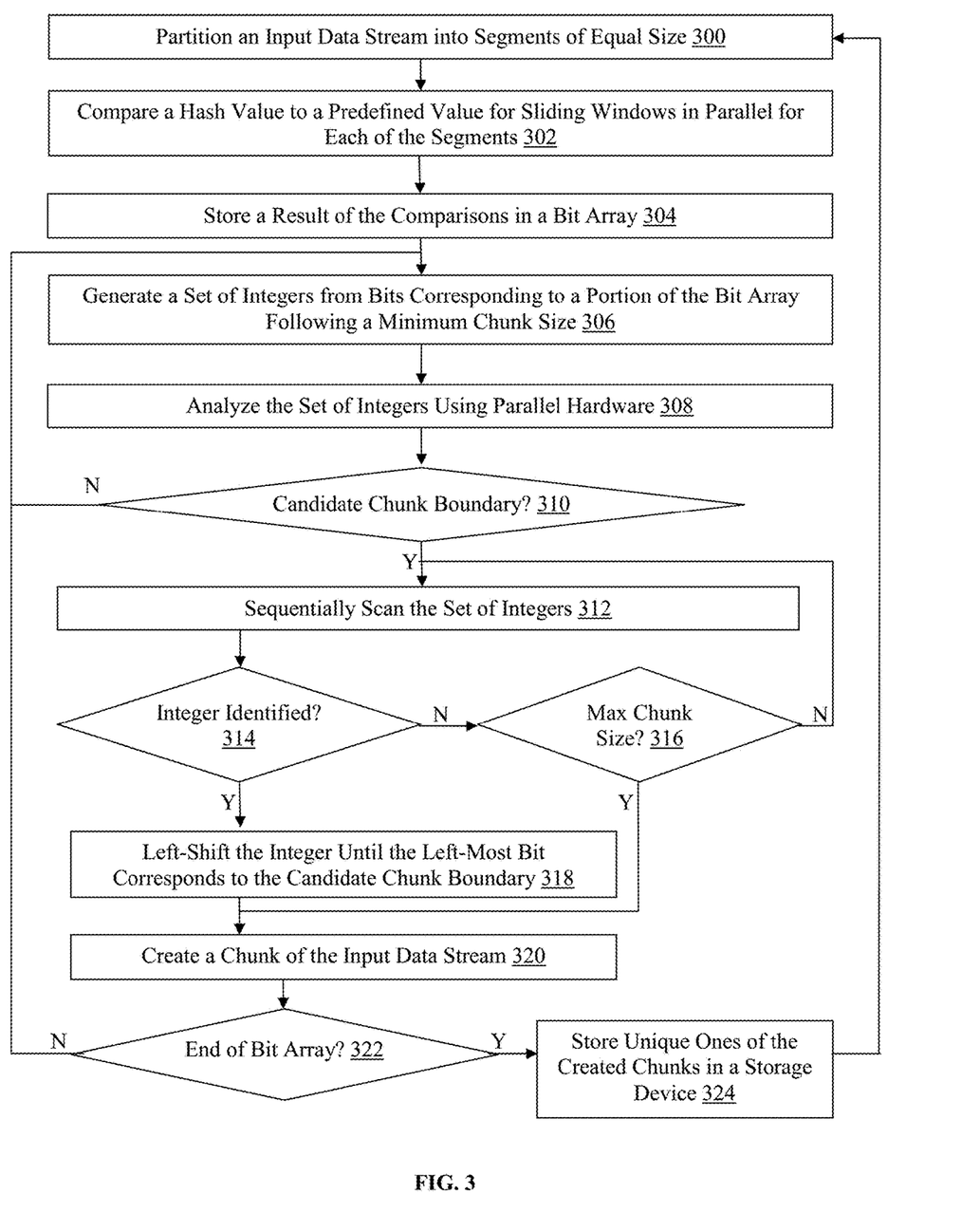
FIG. 3 is a flowchart of an exemplary method for optimized variable-size deduplication using two stage content-defined chunking.

Referring more specifically to FIG. 3, a flow diagram illustrating an exemplary method for optimized variable-size deduplication using two stage content-defined chunking is illustrated. In step 300 in this example, the node computing device 106(1) partitions an input data stream into segments of equal size (e.g., 1 MB, although other segment sizes can also be used. The input data stream can be obtained from one of the storage devices 110(1)-110(n) as part of a background deduplication operation or can be received from one of the client devices 108(1)-108(n) as part of an initial storage operation, although other types of methods for obtaining the input data stream can be used in other examples. While the examples are described and illustrated herein with reference to the node computing device 106(1), these examples can be implemented by any one or more of the node computing devices 106(1)-106(n).

In step 302, the node computing device 106(1) compares a hash value to a predefined value for sliding windows in parallel for each of the segments partitioned from the input data stream. The node computing device 106(1) uses a sliding window starting at the beginning of each segment to calculate a hash value and compare the hash value to a predefined value. In this example, each segment is assigned to one of a plurality of threads executing in parallel. Accordingly, the node computing device 106(1) assigns each thread one of the segments and the rolling or sliding window hashing and comparison is performed independently and in parallel by each thread.

In this particular example, one or more of the sliding windows for at least a subset of the segments extends into a contiguous or next one of the segments. Accordingly, in each thread, the sliding window will roll over to an additional portion from the beginning of the next segment, such that a sliding window covers every portion (e.g., byte) in the current segment.

The node computing device 106(1) in this example outputs a 0 or 1 for each sliding window, although other numbers or values can be used. In this particular example, 0 indicates that the hash value does not match the predefined value and the associated sliding window is not a candidate as a chunk boundary, whereas 1 indicates that the hash value matches the predefined value and the sliding window is a candidate as a chunk boundary.

In step 304, the node computing device 106(1) stores a result of the comparisons in a bit array data structure, although other types of data structures can be used in other examples. In particular, the node computing device 106(1) sets one of the bits in the bit array when the hash value matches the predefined value for one of the sliding windows. In other words, the node computing device 106(1) sets an $n^{th}$ bit in the bit array when the hash value matches the predefined value at an offset of n in the input data stream. The set one of the bits represents a chunk boundary candidate.

Accordingly, each of the bits of the bit array corresponds to one of the sliding windows and records whether a match was found of the hash value at the associated offset. In some examples, for an input data stream with N bytes, the output bit array will be N bits. Following step 304 in this example, the node computing device 106(1) will have constructed an array of bits with values of 0s and 1s and each value corresponding to one sliding window in the original input data stream and representing whether the associated sliding window corresponds with a candidate chunk boundary.

Figure 4:
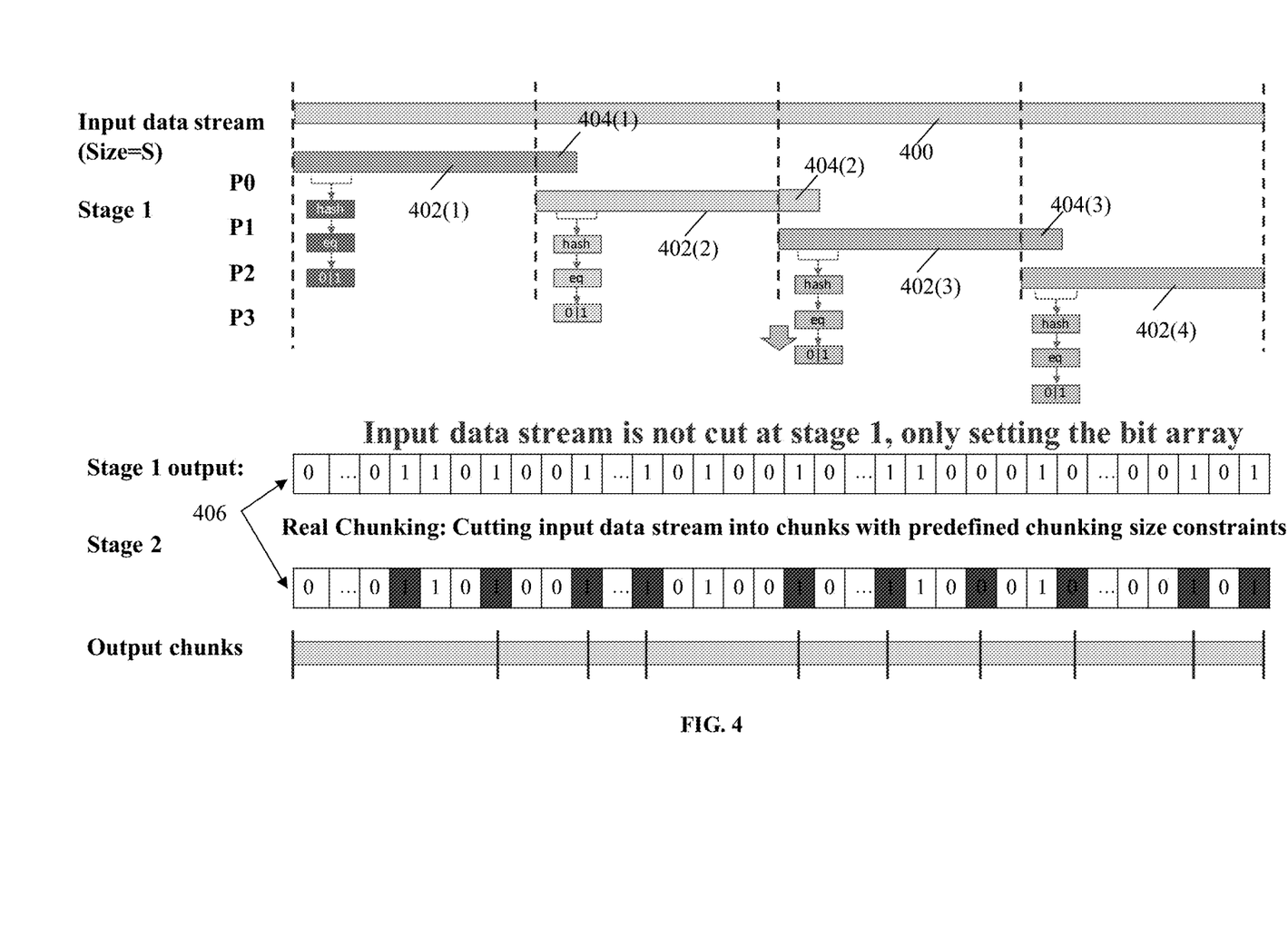
FIG. 4 is a flow diagram illustrating exemplary two stage parallel content-defined chunking.

Referring more specifically to FIG. 4, a flow diagram illustrating exemplary two stage parallel content-defined chunking is illustrated. In this example, the node computing device 106(1) partitions the input data stream 400 into equal size segments 402(1), 402(2), 402(3), and 402(4). Each of the segments 402(1), 402(2), 402(3), and 402(4) is then dispatched to a thread for detecting potential or candidate chunk boundaries. Accordingly, the node computing device 106(1) in this example executes four threads, one for each of segments 402(1), 402(2), 402(3), and 402(4). The threads will continue the rolling or sliding window hashing for portions 404(1), 404(2), and 404(3) of the next or continuous segments.

Accordingly, the rolling window hashing is performed to identify all potential or candidate chunk boundaries and no final chunk boundaries are determined at this stage. Additionally, each thread not only checks the regular segments (i.e., segments 402(1), 402(2), 402(3), and 402(4)), but also checks a portion or set of bytes (i.e., portions 404(1), 404(2), and 404(3) in this example) from the next segment (i.e., segments 402(2), 402(3), and 402(4), respectively, in this example), thereby ensuring that a hash value is generated for every portion or byte in the current segment.

Based on whether there is a match of the hash value with the predefined value for each of the sliding windows, a bit array 406 is populated by the node computing device 106(1). Accordingly, the bit array 406 includes a 1 value in this example for each sliding window for which the generated hash value matched the predefined value and a 0 value for each sliding window for which the generated hash value did not match the predefined value. The 1s in the bit array 406 represent candidate chunk boundaries for the input data stream. The bit array 406 is provided as input to a second stage in which final chunk boundaries are determined from the candidate chunk boundaries, as described and illustrated in more detail with reference to steps 306-324 of FIG. 3 and in FIG. 5.

Referring specifically to FIG. 3, in step 306, the node computing device 106(1) generates a set of integers from a subset of the bits corresponding to a portion of the bit array generated in step 304. The subset of the bits used to generate the set of integers follows a minimum chunk size, which can be configured and established by policy and/or stored in the memory 202, for example. Skipping the minimum chunk size when generating the set of integers effectively allows the node computing device 106(1) to ignore any candidate chunk boundaries that may be represented in the bit array within the bits corresponding to the minimum chunk size.

In step 308, the node computing device 106(1) analyzes the set of integers using parallel hardware to determine whether any of the set of integers includes a candidate chunk boundary. In this particular example, the hardware includes advanced vector extension (AVX) register(s) and processor(s) 200 configured to execute AVX instructions (e.g., AVX-512 instructions), which are extensions to the x86 instruction set architecture for microprocessors that enable performance of vector operations in a single instruction, multiple data (SIMD) manner. For processors with AVX-512 instructions support, as one example, the extended registers are 512-bit long. The use of Intel AVX-512 instructions can enable a 512-bit, or 16 32 bit integer, check with one instruction.

The check in this example is to determine whether any of the set of integers (e.g., 16 integers) includes a 1 that represents a candidate chunk boundary. Accordingly, the node computing device 106(1) loads the set of integers into an AVX register and one of the processor(s) 200 works as a SIMD processor with 16 concurrent threads in this example, each operating on a 32-bit value, to generate an indication of whether any of the integers includes a 1 value representing a candidate chunk boundary. The formation and processing of the set of integers allows the node computing device 106(1) to effectively skip the 0s in the bit array, which will be the most common occurring value, and identify final chunk boundaries more efficiently.

In step 310, the node computing device 106(1) determines whether there is a candidate chunk boundary in the analyzed set of integers generated from the bit array based on the processing of the analyzed set of integers by the parallel hardware. If the node computing device 106(1) does not determine that there is a candidate chunk boundary in the set of integers, then the No branch is taken back to step 306, and the node computing device 106(1) again generates another set of integers from bits corresponding to a portion of the bit array.

Accordingly, when the No branch is taken from step 310, the set of integers comprised all 0 values in this example, facilitating relatively efficient processing of the bit array (e.g., as compared to a sequential scan of the bit array). However, if the node computing device 106(1) determines that there is a candidate chunk boundary in the set of integers (i.e. a 1 value in at least one of the bits from the bit array from which at least one of the integers in the set was generated), then the Yes branch is taken to step 312.

In step 312, the node computing device 106(1) sequentially scans the set of integers. In this example, the node computing device 106(1) scans the set of integers in the AVX register to identify a first one of the set of integers that includes a 1 value representing a candidate chunk boundary.

Figure 5:
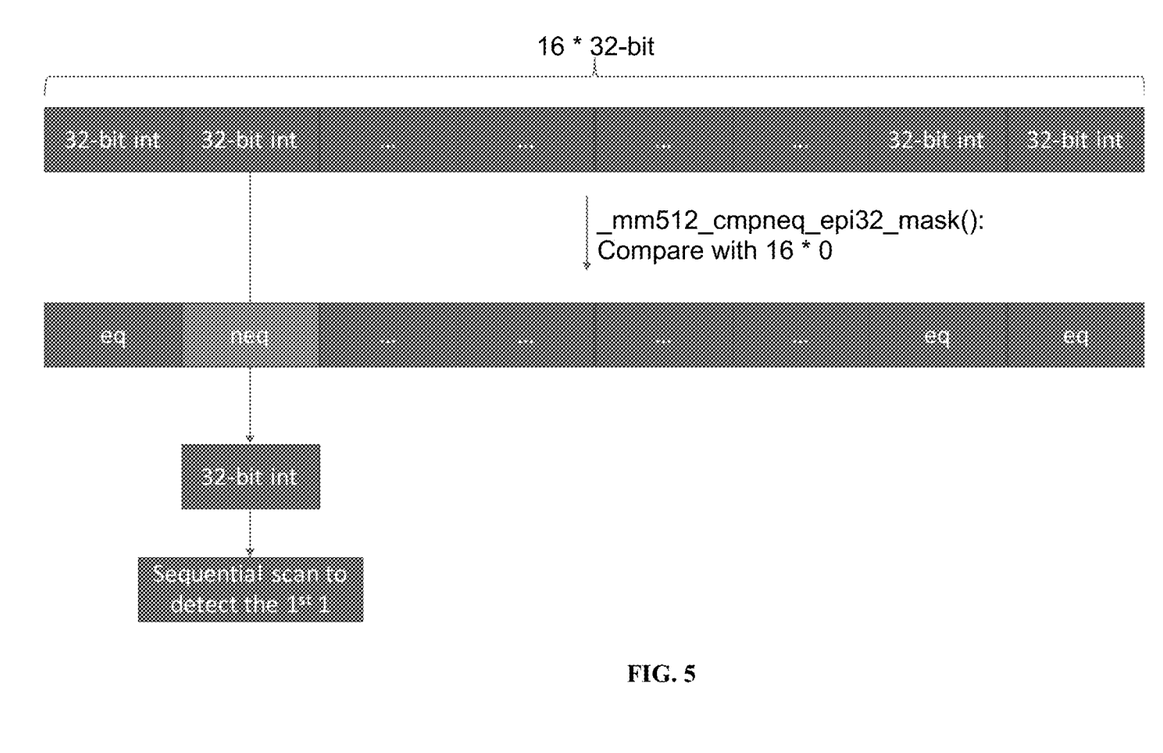
FIG. 5 is a flow diagram illustrating exemplary parallel chunk boundary determination.

Referring to FIG. 5, a flow diagram illustrating exemplary parallel chunk boundary determination is illustrated. In this example, after skipping the minimum chunk size of bits, every 512 bits are loaded by the node computing device 106(1) from a bit array (e.g., bit array 406) as 16 32-bit integers into an AVX-512 register. Then, an AVX instruction (e.g., _mm512_cmpneq_epi32_mask) is executed by the node computing device 106(1) to determine whether all 16 integers comprise 0s. If any of these 16 32 bit integers is not equal to 0, then a sequential scan is performed by the node computing device 106(1) within the 16 integers to find the first integer which is non-zero.

Referring back to FIG. 3, in step 314, the node computing device 106(1), while scanning the set of integers, determines whether a first one of the set of integers that includes the candidate chunk boundary is identified. If the node computing device 106(1) does not determine that the first one of the set of integers that includes the candidate chunk boundary is identified, then the No branch is taken to step 316.

In step 316, the node computing device 106(1) determines whether a maximum chunk size has been reached. The maximum chunk size can be configured and established by a policy and/or may be stored in the memory 202, for example. In one example, the node computing device 106(1) maintains a current chunk size based on the identification of a last final chunk boundary from one of the candidate chunk boundaries, as described and illustrated in more detail below.

For example, if the node computing device 106(1) determines in step 310 that a set of integers does not include a candidate chunk boundary, then the current chunk size can be incremented based on a size corresponding to the number of sliding windows in a segment of the input data stream represented by the bits in the set of integers. In another example in which the maximum chunk size may be relatively small (e.g., corresponding to less than a set of integers), the current chunk size can be incremented as the node computing device 106(1) sequentially scans a set of integers in steps 312-314 to determine whether enough 0 bits have been encountered such that the maximum chunk size has been reached.

If the current chunk size reaches the maximum chunk size, then the node computing device 106(1) establishes a final chunk boundary irrespective of whether a first one of the set of integers including a candidate chunk boundary has been reached as part of the sequential scan. If the node computing device 106(1) determines in step 316 that the maximum chunk size has not been reached, then the No branch is taken back to step 312, and the node computing device 106(1) continues sequentially scanning the set of integers.

Accordingly, the node computing device 106(1) effectively sequentially scans the set of integers until a first one of the set of integers that includes a candidate boundary is identified or the maximum chunk size is reached. Referring back to step 314, if the node computing device 106(1) determines that a first one of the set of integers is identified that includes a candidate chunk boundary, then the Yes branch is taken to step 318.

In step 318, the node computing device 106(1) left-shifts the first one of the set of integers until the left-most bit comprises a value (e.g., 1) that corresponds to the candidate chunk boundary. Since the candidate boundary is beyond a minimum chunk size from the prior chunk, if any, and within the maximum chunk size, the candidate boundary now represents a final chunk boundary. Subsequent to left-shifting the first one of the set of integers until the left-most bit corresponds to the candidate chunk boundary in step 318, or if the node computing device 106(1) determines in step 316 that the maximum chunk size is reached and the Yes branch is taken, then the node computing device 106(1) proceeds to step 320.

In step 320, the node computing device 106(1) creates a chunk of the input data stream. If the first one of the set of integers was identified in step 314 prior to the maximum chunk size being reached, then the chunk of the input data stream is created based on the candidate chunk boundary, which is not a final chunk boundary. However, if the maximum chunk size was reached in step 316 before the first one of the set of integers was identified, then the chunk of the input data stream is created based on the bit of one of the set of integers that was reached during the sequential scan upon satisfaction of the maximum chunk size.

The bit corresponding to the final chunk boundary or the maximum chunk size is at an offset in the set of integers that corresponds with a location of one of the sliding window for one of the segments partitioned from the input data stream. Accordingly, the chunk of the input data stream is created at a portion of the sliding window (e.g., the beginning) within the one of the partitioned segments.

In step 322, the node computing device 106(1) determines whether the end of the bit array has been reached. If the node computing device 106(1) determines that the end of the bit array has not been reached, then the No branch is taken back to step 306, and another set of integers is generated. Accordingly, the node computing device 106(1) effectively repeats steps 306-322 for the remainder of the bit array until all of the final chunk boundaries are identified. If the node computing device 106(1) determines that the end of the bit array has been reached, then the Yes branch is taken to step 324.

In step 324, the node computing device 106(1) stores unique ones of the created chunks of the input data stream that are defined by the final chunk boundaries in a storage device, such as one of data storage devise 110(1)-110(n) for example. Subsequent to storing the unique ones of the created chunks, the node computing device 106(1) proceeds back to step 300 and partitions another input data stream in this example. In other examples, one or more of steps 300-324 can be performed in a different order and/or in parallel.

Figure 6:
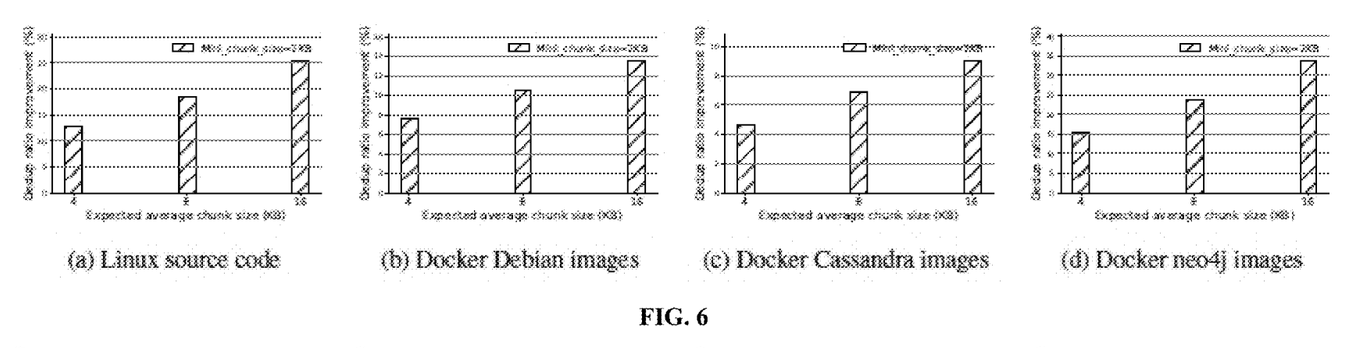
FIG. 6 is a set of graphs illustrating deduplication ratio improvements of examples of this technology over parallel content-defined chunking (CDC) with variable average chunk size and fixed minimum and maximum chunk sizes.
Figure 7:
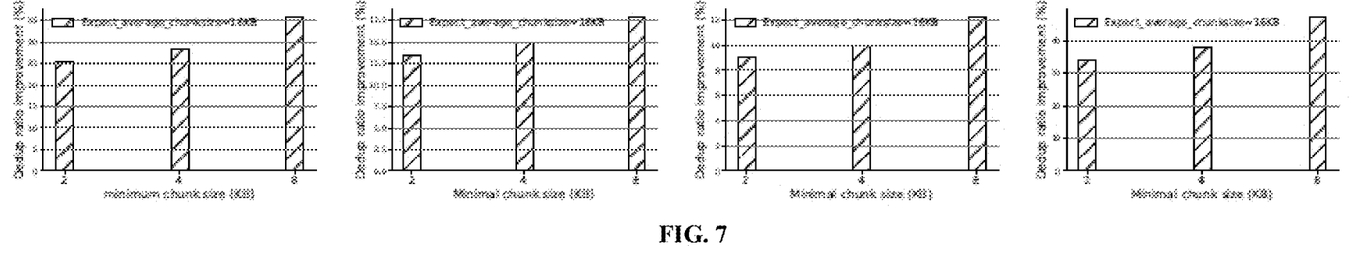
FIG. 7 is a set of graphs illustrating deduplication ratio improvements of examples of this technology over parallel CDC with variable minimum chunk sizes.
Figure 8:
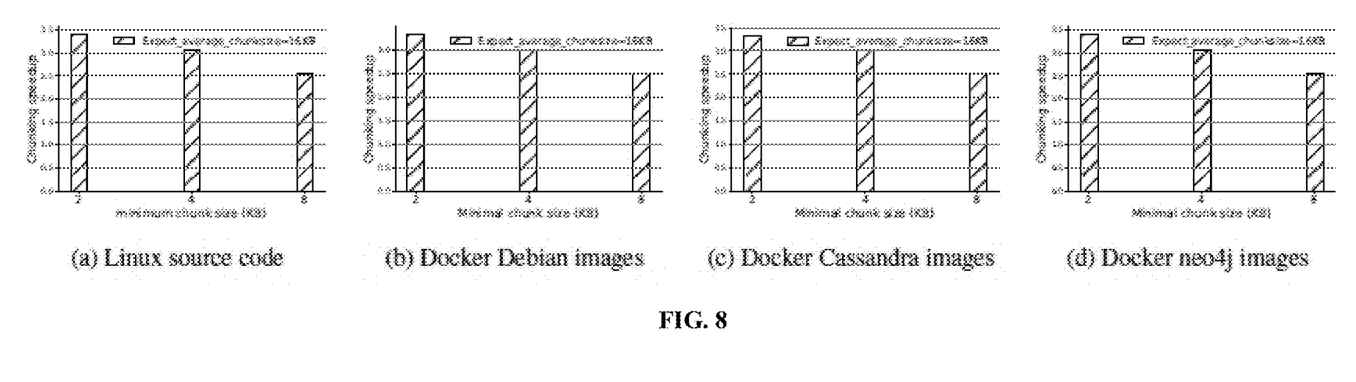
FIG. 8 is a set of graphs illustrating improved chunking speed of examples of this technology over sequential CDC with variable minimum chunk size.

Referring to FIGS. 6-8 various testing results for this technology are illustrated. The tests were conducted on an EC2 C5 large instance server with two virtual central processing units (vCPUs) provided by Amazon Web Services™. The server processors supported Intel™ AVX-512 instructions. The server had four gigabytes (GB) of double data rate 4 (DDR4) memory with an attached one terabyte (TB) NVMe solid state drive (SSD) to store the input datasets.

Additionally, four datasets were use in the evaluation. The first dataset was Linux™ source code from version 3 to 4.9, which was converted from the tar format to the mtar format that provides better deduplication. The other three datasets are images. The size and number of versions for each dataset are illustrated below in Table 1:

TABLE 1

| Name | Size (GB) | Versions |
| --- | --- | --- |
| Linux source code | 570 | 1013 |
| Docker Debian images | 20 | 191 |
| Docker neo4j images | 44 | 130 |
| Docker Cassandra images | 26 | 71 |

Referring specifically to FIG. 6, a set of graphs illustrating deduplication ratio improvements of examples of this technology over parallel content-defined chunking (CDC) with variable average chunk size and fixed minimum and maximum chunk sizes is illustrated. FIG. 6 illustrates the deduplication ratio improvements of this technology over parallel CDC with different average chunk sizes while fixing the minimum and the maximum chunk sizes at two kibibyte (KiB) and 32 KiB, respectively. In particular, the improvements in deduplication ratio using this technology are 34% for Docker™ neo4j images and 22% for Linux™ source code, at 16 kilobyte (KB) chunks. Additionally, the deduplication ratio improvement increases as the average chunk size increases.

Referring to FIG. 7, a set of graphs illustrating deduplication ratio improvements of examples of this technology over parallel CDC with variable minimum chunk sizes is illustrated. FIG. 7 illustrates that this technology achieves higher deduplication ratio improvements when the minimum chunk size increases. When the minimum chunk size equals half of the expected chunk size, the improvement can be as high as 48% for the Docker™ neo4j dataset. When the minimum chunk size becomes larger, it is more likely that candidate chunk boundaries are located within the minimum chunk size range, and are thus skipped due to the minimum chunk size constraints. Accordingly, a chunk boundary shift is more likely to happen leading to lower deduplication for parallel CDC.

Referring to FIG. 8, a set of graphs illustrating improved chunking speed of examples of this technology over sequential CDC with variable minimum chunk size is illustrated. In particular, the minimum chunk size was varied as it has a significant impact on the chunking performance. As reflected in FIG. 8, with a smaller minimum chunk size, this technology provides increased performance, with a peak of 3.3×. When the minimum chunk size increases, the performance increase drops to about 2.5×. Additionally, the performance increase of this technology is relatively stable among all datasets.

With this technology, data deduplication is optimized using a parallel approach for content-defined variable-size chunking. In particular, content-defined chunking is implemented in two stages: hash computation and comparison and chunk boundary determination. The hash computation and comparison is decoupled from the chunk boundary determination to avoid making chunking decisions without consideration of chunk boundaries from previous segments. The hash computation and comparison is executed in parallel using threads. Additionally, the chunk boundary determination utilizes parallel hardware to analyze a bit array of potential chunk boundaries. Leverages the two stages and parallel processing, this technology advantageously achieves improved chunking performance and deduplication ratio.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method, comprising:
    comparing, by a computing device, a hash value to a predefined value for sliding windows in parallel for each of a plurality of segments partitioned from an input data stream;
    parsing, by the computing device, a bit array according to minimum and maximum chunk sizes to identify a plurality of chunk boundaries for the input data stream, wherein the bit array is populated based on a result of the comparison and portions of the bit array are parsed in parallel; and
    storing, by the computing device, unique chunks of the input data stream defined by the chunk boundaries in a storage device.

2. The method of claim 1, wherein each of a plurality of bits of the bit array corresponds to one of the sliding windows and one or more of the sliding windows for a subset of the segments extend into a contiguous one of the segments.

3. The method of claim 1, further comprising setting, by the computing device, one of the bits in the bit array when the hash value matches the predefined value for one of the sliding windows, wherein the set one of the bits represents a chunk boundary candidate.

4. The method of claim 3, further comprising setting, by the computing device, an $n^{th}$ bit in the bit array when the hash value matches the predefined value at an offset of n in the input data stream.

5. The method of claim 1, further comprising loading, by the computing device, integers into an Advanced Vector Extensions (AVX) register, wherein each of the integers corresponds to a set of bits that comprises one of the portions of the bit array and each of the sets of bits follow a last identified one of the chunk boundaries in the bit array by the minimum chunk size.

6. The method of claim 5, further comprising sequentially scanning, by the computing device, the integers in the AVX register to identify one of the integers and left-shifting the one of the integers until the left-most bit comprises a value corresponding to one of the chunk boundaries, when an AVX instruction indicates that the one of the integers includes the value.

7. A non-transitory machine readable medium having stored thereon instructions for optimized variable-size deduplication using two stage content-defined chunking comprising machine executable code which when executed by at least one machine causes the machine to:
    compare a hash value to a predefined value for sliding windows in parallel for each of a plurality of segments partitioned from an input data stream;
    parse a bit array according to minimum and maximum chunk sizes to identify a plurality of chunk boundaries for the input data stream, wherein the bit array is populated based on a result of the comparison and portions of the bit array are parsed in parallel; and
    store unique chunks of the input data stream defined by the chunk boundaries in a storage device.

8. The non-transitory machine readable medium of claim 7, wherein each of a plurality of bits of the bit array corresponds to one of the sliding windows and one or more of the sliding windows for a subset of the segments extend into a contiguous one of the segments.

9. The non-transitory machine readable medium of claim 7, wherein the machine executable code when executed by the machine further causes the machine to set one of the bits in the bit array when the hash value matches the predefined value for one of the sliding windows, wherein the set one of the bits represents a chunk boundary candidate.

10. The non-transitory machine readable medium of claim 9, wherein the machine executable code when executed by the machine further causes the machine to set an $n^{th}$ bit in the bit array when the hash value matches the predefined value at an offset of n in the input data stream.

11. The non-transitory machine readable medium of claim 7, wherein the machine executable code when executed by the machine further causes the machine to load integers into an Advanced Vector Extensions (AVX) register, wherein each of the integers corresponds to a set of bits that comprises one of the portions of the bit array and each of the sets of bits follow a last identified one of the chunk boundaries in the bit array by the minimum chunk size.

12. The non-transitory machine readable medium of claim 11, wherein the machine executable code when executed by the machine further causes the machine to sequentially scan the integers in the AVX register to identify one of the integers and left-shift the one of the integers until the left-most bit comprises a value corresponding to one of the chunk boundaries, when an AVX instruction indicates that the one of the integers includes the value.

13. A computing device, comprising:
    a memory containing machine readable medium comprising machine executable code having stored thereon instructions for optimized variable-size deduplication using two stage content-defined chunking; and
    a processor coupled to the memory, the processor configured to execute the machine executable code to cause the processor to:
        compare a hash value to a predefined value for sliding windows in parallel for each of a plurality of segments partitioned from an input data stream;
        parse a bit array according to minimum and maximum chunk sizes to identify a plurality of chunk boundaries for the input data stream, wherein the bit array is populated based on a result of the comparison and portions of the bit array are parsed in parallel; and
        store unique chunks of the input data stream defined by the chunk boundaries in a storage device.

14. The computing device of claim 13, wherein each of a plurality of bits of the bit array corresponds to one of the sliding windows and one or more of the sliding windows for a subset of the segments extend into a contiguous one of the segments.

15. The computing device of claim 13, wherein the machine executable code to further cause the processor to set one of the bits in the bit array when the hash value matches the predefined value for one of the sliding windows, wherein the set one of the bits represents a chunk boundary candidate.

16. The computing device of claim 15, wherein the machine executable code to further cause the processor to set an $n^{th}$ bit in the bit array when the hash value matches the predefined value at an offset of n in the input data stream.

17. The computing device of claim 13, wherein the machine executable code to further cause the processor to load integers into an Advanced Vector Extensions (AVX) register, wherein each of the integers corresponds to a set of bits that comprises one of the portions of the bit array and each of the sets of bits follow a last identified one of the chunk boundaries in the bit array by the minimum chunk size.

18. The computing device of claim 17, wherein the machine executable code to further cause the processor to sequentially scan the integers in the AVX register to identify one of the integers and left-shift the one of the integers until the left-most bit comprises a value corresponding to one of the chunk boundaries, when an AVX instruction indicates that the one of the integers includes the value.

* * * * *